United States Patent
Lyubina et al.

(10) Patent No.: US 11,078,083 B2
(45) Date of Patent: Aug. 3, 2021

(54) PROCESS FOR PRODUCING A SILICON-CARBON COMPOSITE

(71) Applicant: Evonik Operations GmbH, Essen (DE)

(72) Inventors: Julia Lyubina, Hanau (DE); Michael Kroell, Linsengericht (DE)

(73) Assignee: Evonik Operations GmbH, Essen (DE)

(*) Notice: Subject to any disclaimer, the term of this patent is extended or adjusted under 35 U.S.C. 154(b) by 407 days.

(21) Appl. No.: 16/078,359

(22) PCT Filed: Feb. 28, 2017

(86) PCT No.: PCT/EP2017/054590
§ 371 (c)(1),
(2) Date: Aug. 21, 2018

(87) PCT Pub. No.: WO2017/148911
PCT Pub. Date: Sep. 8, 2017

(65) Prior Publication Data
US 2020/0317529 A1    Oct. 8, 2020

(30) Foreign Application Priority Data

Mar. 1, 2016 (DE) .................. 102016203324.7

(51) Int. Cl.
| H01M 4/02 | (2006.01) |
| C01B 33/02 | (2006.01) |
| C01B 32/05 | (2017.01) |
| H01M 4/133 | (2010.01) |
| H01M 4/38 | (2006.01) |
| H01M 10/0525 | (2010.01) |

(52) U.S. Cl.
CPC .............. *C01B 33/02* (2013.01); *C01B 32/05* (2017.08); *H01M 4/133* (2013.01); *H01M 4/386* (2013.01); *H01M 10/0525* (2013.01); *C01P 2002/02* (2013.01)

(58) Field of Classification Search
CPC ..................................................... H01M 4/02
See application file for complete search history.

(56) References Cited

U.S. PATENT DOCUMENTS

2009/0029256 A1    1/2009    Mah et al.

FOREIGN PATENT DOCUMENTS

| EP | 2 782 167 A1 | 9/2014 |
| JP | 2012-142597 A | 7/2012 |
| JP | 2012-211049 A | 11/2012 |
| WO | WO 88/04333 A1 | 6/1988 |
| WO | 2011/006698 A1 | 1/2011 |

OTHER PUBLICATIONS

Hong et al. "Gas to Particle Conversion Mechanism in Chemical Vapor Deposition of Silicon Carbide by SiH4 and C2H2" Ind. Eng. Chem. Res. 1998, 37, 3602-3609.*
International Search Report dated May 12, 2017, in PCT/EP2017/054590, filed Feb. 28, 2017.
Redondas, X. et al., "Influence of the substrate temperature on silicon-carbon thin films deposited from $SiH_4$ and $C_2H_4$ by excimer lamp-CVD", Thin Solid Films, vol. 317, No. 1-2, XP 004147622, Apr. 1998, pp. 112-115.
Sourice, J., et al., "One-Step Synthesis of Si@C Nanoparticles by Laser Pyrolysis; High-Capacity Anode Material for Lithium-Ion batteries", ACS Applied Materials and Interfaces, vol. 7, No. 12, XP 055365553, Apr. 2015, pp. 6637-6644.
Zhao, G. et al., "High storage performance of core-shell Si@C nanoparticles as lithium ion battery anode material", Materials Letters, vol. 96, XP 028522909, Jan. 2013, pp. 170-173.
U.S. Appl. No. 16/065,194, filed Jun. 22, 2018, Julia Lyubina et al.
U.S. Appl. No. 16/007,547, filed Jun. 13, 2018, Juergen Erwin Lang et al.
U.S. Appl. No. 16/032,683, filed Jul. 11, 2018, Julia Lyubina.
Wang, G.X. et al., "Nanostructured Si—C composite anodes for lithium-ion batteries", Electrochemistry Communications 6, 2004, pp. 689-692.
Magasinski, A. et al., "High-performance lithium-ion anodes using a hierarchical bottom-up approach", Nature Materials, vol. 9, 2010, 10 pages.
Kasavajjula, U. "Nano- and bulk-silicon-based insertion anodes for lithium-ion secondary cells", Journal of Power Sources, vol. 163, 2007, pp. 1003-1039.
Zhang, Z. et al., "Amorphous silicon-carbon nanosphores synthesized by chemical vapor deposition using cheap methyltrichlorosilane as improved anode materials for Li-ion batteries", Nanoscale, vol. 5, 2013, pp. 5384-5389.
Japanese Office Action dated Dec. 22, 2020 in Japanese Patent Application No. 2018-545923, 3 pages.

* cited by examiner

*Primary Examiner* — Jacob B Marks
(74) *Attorney, Agent, or Firm* — Oblon, McClelland, Maier & Neustadt, L.L.P.

(57) ABSTRACT

Process for producing a silicon-carbon composite powder in which
a) a gas stream A containing at least one starting compound of silicon selected from the group consisting of $SiH_4$, $Si_2H_6$ and $Si_3H_8$, and
b) a gas stream B containing at least one starting compound of carbon selected from the group consisting of methane, ethane, propane, ethylene and acetylene
are reacted in a hot wall reactor at a temperature of less than 900° C., the reaction mixture is cooled or allowed to cool and the pulverulent reaction product is separated from gaseous materials.

9 Claims, No Drawings

PROCESS FOR PRODUCING A SILICON-CARBON COMPOSITE

The invention relates to a process for producing a silicon-carbon composite, a special composite, and to the use thereof as an anode material for lithium-ion batteries.

Silicon composites have great potential as an anode material in lithium-ion batteries. On account of the large volume change of the silicon during repeated charging/discharging these silicon composites cannot be used as an anode material.

Intensive efforts have therefore been made to improve cycle stability through use of composites of silicon-graphite, graphene-nanosilicon, silicon-carbon nanotubes, silicon-carbon nanowires, carbon encapsulated with silicon and silicon encapsulated with carbon. Methods for producing these composites are for example pyrolysis, grinding or CVD processes. (Zhang et al., Nanoscale, 5 (2013) 5384 and Kasavajjula et al., Journal Power Sources 163 (2007) 1003).

Magasinki et al., Nat. Mater. 9 (2010) 353, describe the production of a silicon-carbon composite starting from monosilane and propene in a two-stage CVD process. In a first step silicon is applied atop a carrier by introducing an $SiH_4/He$ mixture into a tubular reactor at 700° C. under vacuum. Subsequently, carbon is applied atop this silicon by introducing propene into the tubular reactor under the abovementioned conditions.

WO2011/006698 discloses a process for producing a nanostructured silicon-carbon composite in which a submicron silicon powder is added to a carbon-containing mixture produced by reaction of a hydroxyaromatic compound with an aldehyde and the mixture is carbonized at 500° C. to 1200° C.

A further variant is, according to Wang et al., Electrochem. Commun. 6 (2004), 689, the addition of nanocrystalline silicon powder to a gelling resorcinol/formaldehyde mixture which cures at 85° C. for 10 hours. This mixture is a compact block which is converted at 650° C. into a silicon-carbon composite comprising 40% carbon.

EP-A-2782167 discloses a process for producing an Si/C composite in which silicon and lignin are reacted in an inert gas atmosphere at at least 400° C.

US2009029256 discloses a process for producing an Si/carbon composite in which a mixture of alkaline earth metal and the silicic acid/carbon composite is heated in an inert atmosphere.

The processes known in the prior art are often multistage processes and due to the choice of input materials suitable only for production of laboratory-scale amounts. The present invention accordingly had for its object to provide a process which allows production of an anode material based on silicon and carbon in one reaction stage using input materials available on a large industrial scale.

The invention provides a process for producing a silicon-carbon composite powder in which a) a gas stream A containing at least one starting compound of silicon selected from the group consisting of $SiH_4$, $Si_2H_6$ and $Si_3H_8$, and
b) a gas stream B containing at least one starting compound of carbon selected from the group consisting of methane, ethane, propane, ethylene and acetylene are reacted in a hot wall reactor, preferably a tubular hot wall reactor, at a temperature of less than 900° C., preferably 400-750° C., the reaction mixture is cooled or allowed to cool and the pulverulent reaction product is separated from gaseous materials.

The term silicon-carbon composite powder describes a powder containing at least one phase containing predominantly silicon and at least one phase containing predominantly carbon.

The gas stream A and the gas stream B may be introduced into the hot wall reactor simultaneously, separately from one another or as a mixture of gas stream A and gas stream B.

It may also be advantageous to introduce gas stream B into the hot wall reactor at a later juncture than the gas stream A.

The silicon starting compound/carbon starting compound ratio is preferably chosen such that the Si/C volume fraction in the silicon-carbon composite powder is 30:1-1:30, particularly preferably 20:1-1:1.

The process according to the invention delivers the best results when the starting compound of silicon is $SiH_4$ and the starting compound of carbon is acetylene.

The starting compounds may also be introduced into the hot wall reactor as a mixture with inert gases selected from the group consisting of argon and helium and/or with hydrogen.

There is preferably a laminar flow through the hot wall reactor.

The invention further provides a special silicon-carbon composite powder having an Si/C volume fraction of 20:1-1:10 which contains silicon particles having an average diameter of 300 nm or less, preferably 50-200 nm, wherein the surface of the silicon particles is at least partly encapsulated with an amorphous, carbon-containing layer having an average layer thickness of less than 200 nm, preferably 10-100 nm. Complete encapsulation is preferred.

The silicon particles may be in amorphous form or in the form of a mixture of amorphous silicon and silicon crystallites of unordered orientation having a diameter of about 5-15 nm. A high amorphous proportion is preferred.

The amorphous, carbon-containing layer may comprise aliphatic, aromatic and/or graphitic species.

A phase whose x-ray diffractogram comprises at least one broad maximum, a so-called amorphous halo, is described as amorphous in the context of the invention.

The invention further provides for the use of the special silicon-carbon composite powder as a constituent of the anode of a lithium-ion battery.

EXAMPLES

Example 1

20 vol % of $SiH_4$ and 3 vol % of acetylene are introduced as a homogeneous mixture into the core of a tubular hot wall reactor via a nozzle. In addition, argon is employed as veil gas. There is a laminar flow through the hot wall reactor. A temperature of 700° C. is measured at the reactor outer wall. The pulverulent solid is separated from gaseous substances in a filter and packed under inert conditions via an airlock system.

The particle size and particle morphology of the pulverulent solid are investigated by transmission electron microscopy (TEM). The median particle size is 260 nm. The particles have a virtually spherical shape.

The silicon and carbon content is measured at selected points by energy dispersive x-ray analysis (EDX) in the TEM. A high carbon content of 90-95 at % is measured at the particle edge. The particle centre has an Si:C atom concentration ratio of 60:40. It is to be noted that during acquisition of the EDX spectrum of the particles a signal for both the particle core and the particle surface is measured.

The high carbon content at the particle edge and the relatively low carbon content upon EDX measurement at the particle centre indicate the formation of a silicon-carbon composite powder where the surface of the particles is encapsulated with a carbon-containing layer.

Rietveld refinement of the x-ray diffractograms makes it possible to calculate the proportions of the phases in the pulverulent solid. According to the Rietveld refinement the pulverulent solid contains predominantly an amorphous phase (85 vol %). The amorphous phase is characterized by three broad reflections. These broad reflections, also known as a halo, are characteristic of an amorphous phase. In addition to the amorphous phase 15 vol % of nanocrystalline silicon is found.

Example 2

20 vol % of $SiH_4$ and 3.2 vol % of ethylene are introduced as a homogeneous mixture into the core of a tubular hot wall reactor via a nozzle. In addition, argon is employed as veil gas. There is a laminar flow through the hot wall reactor. A temperature of 650° C. is measured at the reactor outer wall. The pulverulent solid is separated from gaseous substances in a filter and packed under inert conditions via an airlock system.

The particle size and particle morphology of the pulverulent solid are investigated by transmission electron microscopy (TEM). The median particle size is 150 nm. The particles have a virtually spherical shape.

The silicon and carbon content is measured at selected points by energy dispersive x-ray analysis (EDX) in the TEM. A high carbon content of 80-83 at % is measured at the particle edge. The particle centre has an Si:C atom concentration ratio of 35:65. The high carbon content at the particle edge and the relatively low carbon content upon EDX measurement at the particle centre indicate the formation of a silicon-carbon composite powder where the surface of the particles is encapsulated with a carbon-containing layer.

Rietveld refinement of the x-ray diffractograms makes it possible to calculate the proportions of the phases in the pulverulent solid. According to the Rietveld refinement the pulverulent solid contains predominantly an amorphous Si phase (96 vol %). The amorphous phase is characterized by three broad reflections. These broad reflections, also known as a halo, are characteristic of an amorphous phase. In addition, 4 vol % of nanocrystalline silicon is found.

Example 3

20 vol % of $SiH_4$ and 3.1 vol % of ethane are introduced as a homogeneous mixture into the core of a tubular hot wall reactor via a nozzle. In addition, argon is employed as veil gas. There is a laminar flow through the hot wall reactor. A temperature of 650° C. is measured at the reactor outer wall. The pulverulent solid is separated from gaseous substances in a filter and packed under inert conditions via an airlock system.

The particle size and particle morphology of the pulverulent solid are investigated by transmission electron microscopy (TEM). The median particle size is 210 nm. The particles have a virtually spherical shape. The silicon and carbon content is measured at selected points by energy dispersive x-ray analysis (EDX) in the TEM. A high carbon content of 84-92 at % is measured at the particle edge. The particle centre has an Si:C atom concentration ratio of 40:60. The high carbon content at the particle edge and the relatively low carbon content upon EDX measurement at the particle centre indicate the formation of a silicon-carbon composite powder where the surface of the particles is encapsulated with a carbon-containing layer.

Rietveld refinement of the x-ray diffractograms makes it possible to calculate the proportions of the phases in the pulverulent solid. According to the Rietveld refinement the pulverulent solid contains predominantly an amorphous Si phase (97 vol %). The amorphous phase is characterized by three broad reflections. These broad reflections, also known as a halo, are characteristic of an amorphous phase. In addition, 3 vol % of nanocrystalline silicon is found.

Example 4

20 vol % of $SiH_4$ and 3.2 vol % of propane are introduced as a homogeneous mixture into the core of a tubular hot wall reactor via a nozzle. In addition, argon is employed as veil gas. There is a laminar flow through the hot wall reactor. A temperature of 650° C. is measured at the reactor outer wall. The pulverulent solid is separated from gaseous substances in a filter and packed under inert conditions via an airlock system.

The particle size and particle morphology of the pulverulent solid are investigated by transmission electron microscopy (TEM). The median particle size is 200 nm. The particles have a virtually spherical shape.

The silicon and carbon content is measured at selected points by energy dispersive x-ray analysis (EDX) in the TEM. A high carbon content of 97 at % is measured at the particle edge. The particle centre has an Si:C atom concentration ratio of 53:47. The high carbon content at the particle edge and the relatively low carbon content upon EDX measurement at the particle centre indicate the formation of a silicon-carbon composite powder where the surface of the particles is encapsulated with a carbon-containing layer.

Rietveld refinement of the x-ray diffractograms makes it possible to calculate the proportions of the phases in the pulverulent solid. According to the Rietveld refinement the pulverulent solid contains predominantly an amorphous Si phase (94 vol %). The amorphous phase is characterized by three broad reflections. These broad reflections, also known as a halo, are characteristic of an amorphous phase. In addition, 6 vol % of nanocrystalline silicon is observed.

Example 5

20 vol % of $SiH_4$ and 6.3 vol % of methane are introduced as a homogeneous mixture into the core of a tubular hot wall reactor via a nozzle. In addition, a mixture of argon and hydrogen is employed as veil gas. There is a laminar flow through the hot wall reactor. A temperature of 650° C. is measured at the reactor outer wall. The pulverulent solid is separated from gaseous substances in a filter and packed under inert conditions via an airlock system.

The particle size and particle morphology of the pulverulent solid are investigated by transmission electron microscopy (TEM). The median particle size is 195 nm. The particles have a virtually spherical shape.

The silicon particles are partly encapsulated with a carbon-containing layer.

Rietveld refinement of the x-ray diffractograms makes it possible to calculate the proportions of the phases in the pulverulent solid. According to the Rietveld refinement the pulverulent solid contains predominantly an amorphous Si phase (93 vol %). The amorphous phase is characterized by three broad reflections. These broad reflections, also known as a halo, are characteristic of an amorphous phase. In addition, 7 vol % of nanocrystalline silicon is observed.

Example 6

20 vol % of $SiH_4$ is introduced into the hot wall reactor core of a tubular hot wall reactor via a nozzle and 3.5 vol % of ethylene is introduced into said reactor laterally. In addition, argon is employed as veil gas. There is a laminar flow through the hot wall reactor. A temperature of 650° C. is measured at the reactor outer wall. The pulverulent solid is separated from gaseous substances in a filter and packed under inert conditions via an airlock system.

The particle size and particle morphology of the pulverulent solid are determined by transmission electron microscopy (TEM). The median particle size is 170 nm. The particles have a virtually spherical shape. Silicon and carbon content is measured at selected points by energy dispersive x-ray analysis (EDX) in the TEM. A high carbon content of 99 at % is measured at the particle edge. The particle centre has an Si:C atom concentration ratio of 80:20.

Rietveld refinement of the x-ray diffractograms makes it possible to calculate the proportions of the phases in the pulverulent solid. According to said refinement the pulverulent solid contains predominantly an amorphous Si phase (85 vol %). The amorphous phase is characterized by three broad reflections. These broad reflections, also known as a halo, are characteristic of an amorphous phase. In addition, 15 vol % of nanocrystalline silicon is found.

Input materials and materials properties are summarized in the table.

TABLE

Input materials and materials properties of the silicon-carbon composite powders.

| Example | Input materials vol % | Median particle diameter[a] nm | C particle edge[b] at % | Si:C particle centre[b] at %/at % | Amorphous proportion[c] % |
|---|---|---|---|---|---|
| 1 | 20 $SiH_4$/3 $C_2H_2$ | 260 | 90-95 | 1.5:1 | 85 |
| 2 | 20 $SiH_4$/3 $C_2H_4$ | 150 | 80-83 | 1:1.85 | 96 |
| 3 | 20 $SiH_4$/3.1 $C_2H_6$ | 210 | 84-92 | 1:1.5 | 97 |
| 4 | 20 $SiH_4$/3.2 $C_3H_8$ | 200 | 97 | 1:1.13 | 94 |
| 5 | 20 $SiH_4$/6.3 $CH_4$ | 195 | — | — | 93 |
| 6 | 20 $SiH_4$/3.5 $C_2H_4$ | 170 | 99 | 4:1 | 85 |

[a]TEM;
[b]EDX;
[c]x-ray diffractometry

The invention claimed is:

1. A process for producing a silicon-carbon composite powder, the process comprising:
   feeding
   a) a gas stream A comprising at least one silicon starting compound selected from the group consisting of $SiH_4$, $Si_2H_6$ and $Si_3H_8$, and
   b) a gas stream B comprising at least one carbon starting compound selected from the group consisting of methane, ethane, propane, ethylene and acetylene into a hot wall reactor at a temperature of less than 900° C., to form a reaction mixture, cooling the reaction mixture or allowing the reaction mixture to cool, and separating a pulverulent reaction product, to obtain the silicon-carbon composite powder,
   wherein the gas stream B is fed into the hot wall reactor after the gas stream A.

2. The process of claim 1, wherein the gas stream A and the gas stream B are fed into the hot wall reactor simultaneously, either separately or in a mixture comprising the gas stream A and the gas stream B.

3. The process of claim 1, wherein an Si/C volume fraction in the silicon-carbon composite powder is in a range of 30:1 to 1:30.

4. The process of claim 1, wherein the silicon starting compound is $SiH_4$ and the carbon starting compound is acetylene.

5. The process of claim 1, further comprising:
   feeding at least one inert gas selected from the group consisting of argon and helium into the hot wall reactor.

6. The process of claim 1, wherein there is a laminar flow through the hot wall reactor.

7. A lithium-ion battery anode comprising a silicon-carbon composite powder, having an Si/C volume fraction in a range of 20:1 to 1:10 and comprising silicon particles having an average diameter of 300 nm or less, wherein a surface of the silicon particles is at least partly encapsulated with an amorphous, carbon-comprising layer having an average layer thickness of less than 200 nm.

8. The lithium-ion battery anode of claim 7, wherein the silicon particles are amorphous.

9. The lithium-ion battery anode of claim 7, wherein the amorphous, carbon-comprising layer comprises at least one species selected from the group consisting of an aliphatic, an aromatic and a graphitic species.

* * * * *